United States Patent [19]
Hibino

[11] 4,403,160
[45] Sep. 6, 1983

[54] POLE CHANGE TYPE MOTOR

[75] Inventor: Sadayoshi Hibino, Suzuka, Japan

[73] Assignee: Tokyo Shibaura Denki Kabushiki Kaisha, Kawasaki, Japan

[21] Appl. No.: 331,271

[22] Filed: Dec. 16, 1981

[30] Foreign Application Priority Data

Dec. 25, 1980 [JP] Japan ............................... 55-184235
Mar. 17, 1981 [JP] Japan ............................... 56-38550

[51] Int. Cl.³ ............................................. H02K 3/00
[52] U.S. Cl. ................................... 310/184; 310/185; 310/198
[58] Field of Search ............................... 310/184–206

[56] References Cited

U.S. PATENT DOCUMENTS 4,138,619 2/1979 Broadway et al. ............. 310/198 X
4,144,470 3/1979 Acingev .............................. 310/198
4,338,534 7/1982 Broadway et al. ................. 310/184

OTHER PUBLICATIONS

The Institution of Electrical Engineers, Paper No. 33064, Dec.'60 pp. 513–528; Speed-Changing Induction Motors, G. H. Rawcliffe et al.
PROC.I.E.E., vol. 110, No. 9, Sep. 1963, pp. 1649–1655; Three-Speed Single-Winding Squirrel-Cage Induction Motors, W. Fong et al.

Primary Examiner—Donovan F. Duggan
Attorney, Agent, or Firm—Oblon, Fisher, Spivak, McClelland & Maier

[57] ABSTRACT

A pole change type motor has armature windings wound around an iron core in a coaxial fashion with a P (for example 2) number of poles for a high speed operation, which armature windings provide a Q (for example 20) number of poles for a low speed operation by changing the external connections of the windings. Each phase coil of the armature windings is segmented into N (for example P, the same number as the poles) portions, a one-pole portion of each phase coil being comprised of a plurality (for example 2) of coils. The plurality of coils include one or more coils of which polarity is changed by changing the external connections of the armature coils and one or more second coils alternately disposed with respect to the first coils, of which the polarity is left unchanged by changing the external connections.

9 Claims, 16 Drawing Figures

TO POWER SUPPLY

FIG. 3
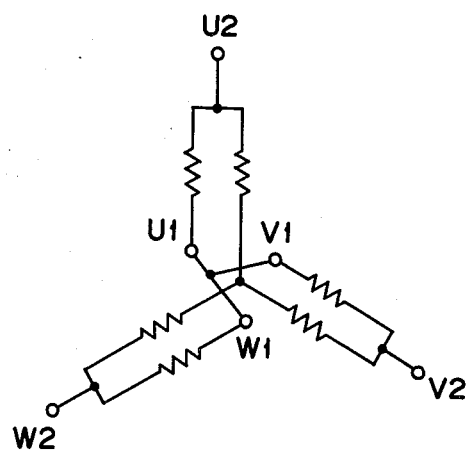
FIG. 4A
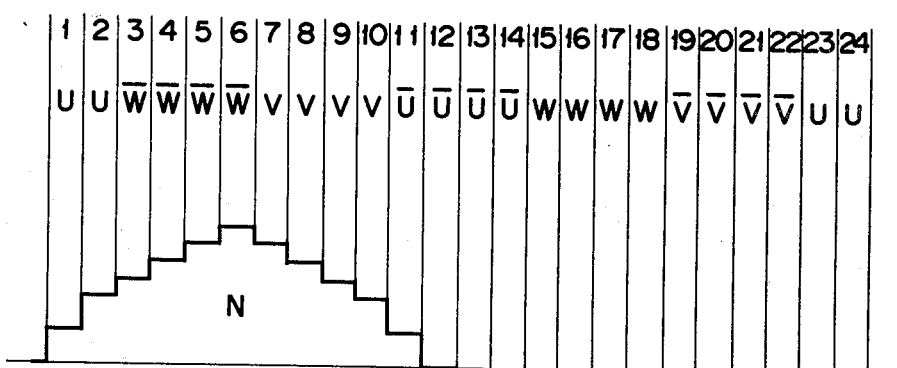
FIG. 4B

TO POWER SUPPLY

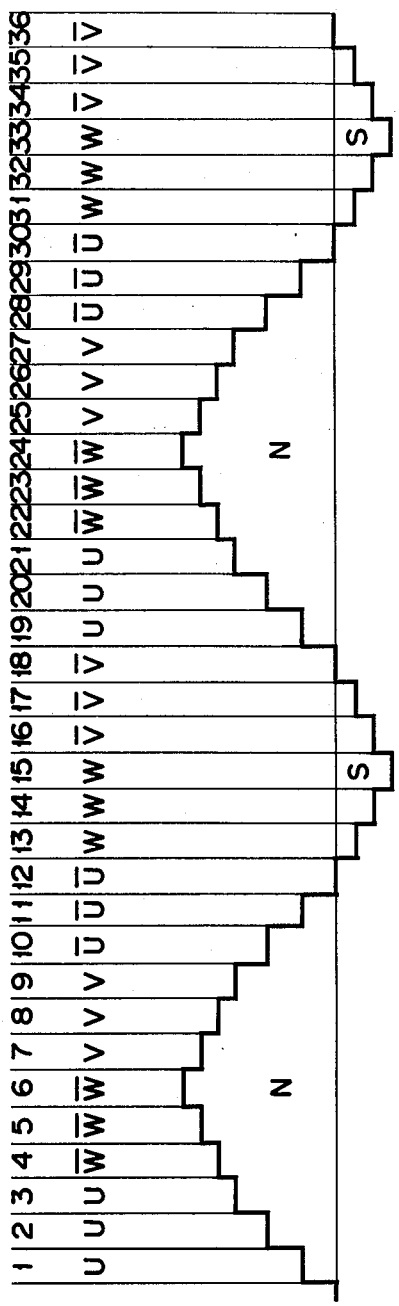
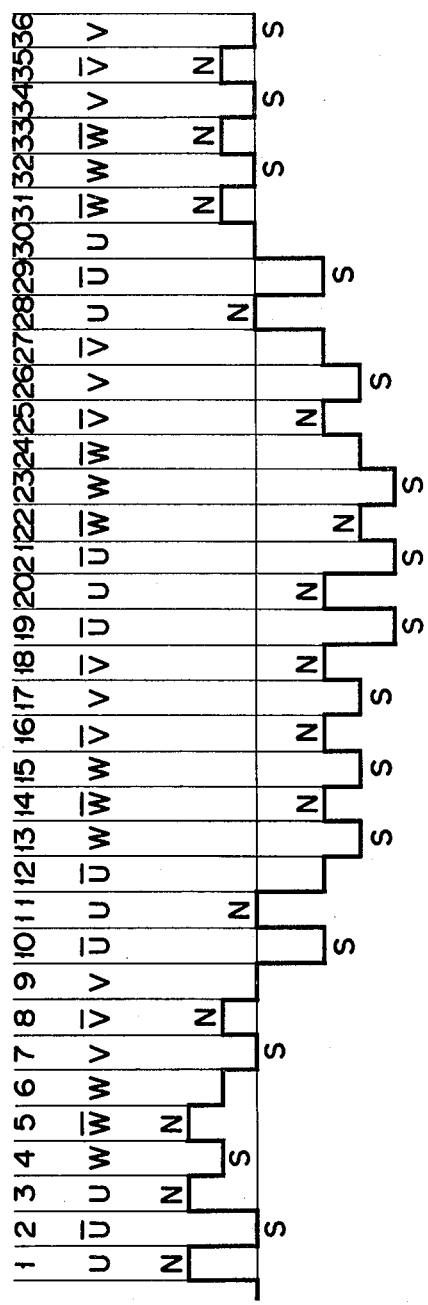
FIG. 10A
FIG. 10B
FIG. 12A
FIG. 12B

POLE CHANGE TYPE MOTOR

BACKGROUND OF THE INVENTION

The present invention relates to a rotary electric machine and, more particularly, to a pole change type motor with armature coils allowing the change of the number of poles.

In machine tool feeders, cargo gears, etc., for the purpose of improving an accuracy of the stopping position and of mitigating the shock at the stop of the drive mechanism, the rotating speed is first dropped from high to low, then the brake is applied. The method for making use of the regenerative braking of the induction motor, which is caused when its speed changes from high to low, has frequently been employed. To these purposes, a method using a pole change type motor, which is capable of changing the number of rotations of the drive motor by two or more steps, or two or more motors with different poles has been used.

The method using two motors with different number of poles not only needs an increased area for their installation but also are expensive. In the case of using the pole change type motor, a large speed ratio such as 1:4 or 1:8 is required. For this reason, different windings which provide different poles are applied for a single armature. For example, when the number of rotations for two-pole and twenty-pole windings are required, the two-pole and twenty-pole windings are applied for a single armature core. In operation, when the motor is operated in a two-pole mode, the twenty-pole windings are not used, while when the twenty-pole windings are used, the two-pole windings are not used.

In this approach, however, the armature windings are inefficiently used and the size of the armature core is large, thus hindering the miniaturization of the motor.

SUMMARY OF THE INVENTION

Accordingly, an object of the invention is to provide a pole change type motor which can reduce the size of the armature core by efficiently using armature windings.

Another object of the present invention is to provide a pole change type motor which can reduce the size of an induction motor by efficiently using the armature windings.

According to the present invention, there is provided a pole change type motor comprising: armature windings wound around an iron core in a coaxial fashion with a P number of poles for a high speed operation, which armature windings provide a Q number of poles for a low speed operation by changing the external connections of the windings, each phase coil of the armature coils being segmented into N portions, a one-pole portion of each phase coil being comprised of a plurality of coils, the plurality of coils including one or more first coils of which the polarity is changed by changing the external connections of the armature coils and one or more second coils alternately disposed with respect to the first coils, of which the polarity is left unchanged by changing the external connections.

According to the pole change type motor according to the present invention, the P (for example 2) number of the poles for the high speed operation can readily be changed to the Q (for example) number of the poles for the low speed operation by changing the external connections of the armature windings. Therefore, according to the present invention, the armature windings may more efficiently be used than the conventional one, resulting in the reduction of the motor size.

BRIEF DESCRIPTION OF THE DRAWINGS

By way of example and to make the description clearer, reference is made to the accompanying drawings, in which:

FIG. 3 is a connection arrangement of the three-phase armature windings shown in FIG. 2;

FIG. 4A shows an arrangement of conductors of the three-phase armature windings shown in FIG. 2;

FIG. 4B shows a distribution of magnetomotive forces of the three-phase armature windings shown in FIG. 2;

FIG. 10A shows an arrangement of conductors of the three-phase armature windings shown in FIG. 8;

FIG. 10B shows a distribution of magnetomotive forces of the three-phase armature windings shown in FIG. 8;

FIG. 12A shows an arrangement of conductors of the three-phase armature windings shown in FIG. 11;

FIG. 12B shows a distribution of magnetomotive forces of the three-phase armature windings shown in FIG. 11.

DETAILED DESCRIPTION OF THE PREFERRED EMBODIMENTS

Figure 1:
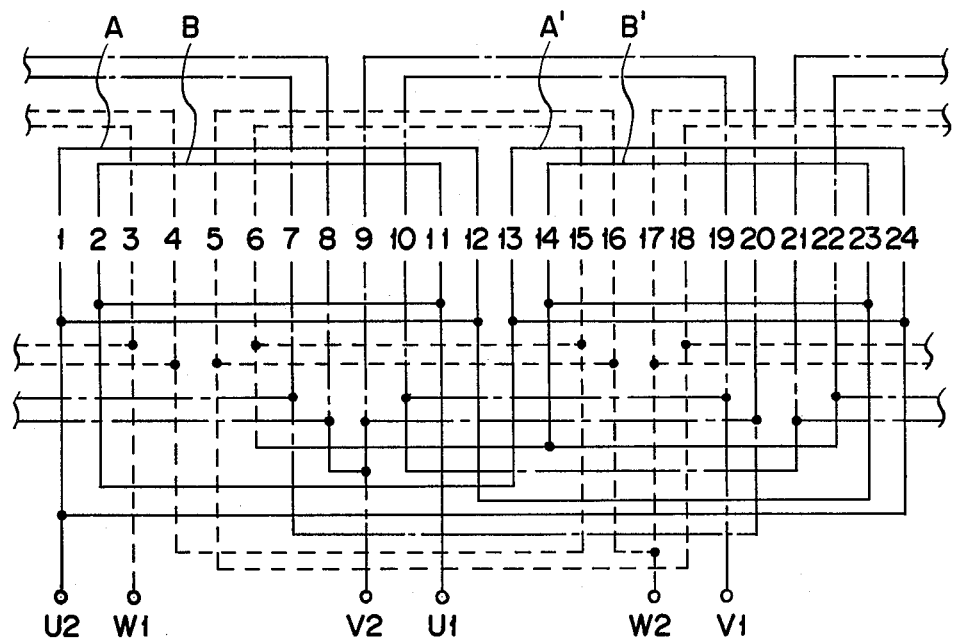
FIG. 1 is a wiring diagram of three-phase armature windings of a pole change type motor which is a first embodiment of the present invention.

A first embodiment of a pole change type motor according to the present invention will be described referring to the accompanying drawings. In the present embodiment, the number of armature grooves is 24, and the armature windings allow a change of the number of poles between the number of poles $p1=2$ for a high speed operation and the number of poles $P2=20$ for a low speed operation. FIG. 1 shows an example of wiring of three-phase armature windings for a pole change type motor as a first embodiment according to the present invention. In FIG. 1, a solid line indicates a U phase coil; a one dot chain line a V phase coil; a broken line a W phase coil. U1 and U2, V1 and V2, and W1 and W2 indicate terminals of the U, V and W phases, respectively. In FIG. 1, the coil of each of phases U, V, and W is wounded being segmented into P1 (=2) portions. In one phase, a one-pole portion still includes an even number (2) of coils: one or more large coils A and small coils B. An adjacent one-pole portion also includes one or more large coils A' and small coils B', or the even number (2) of coils. The large coils A' and the small coil B combined in series make up first coil groups. The large coils A and the small coils B' combined in series make up second coil groups. These first and second coil groups are alternately arranged.

Figure 2:
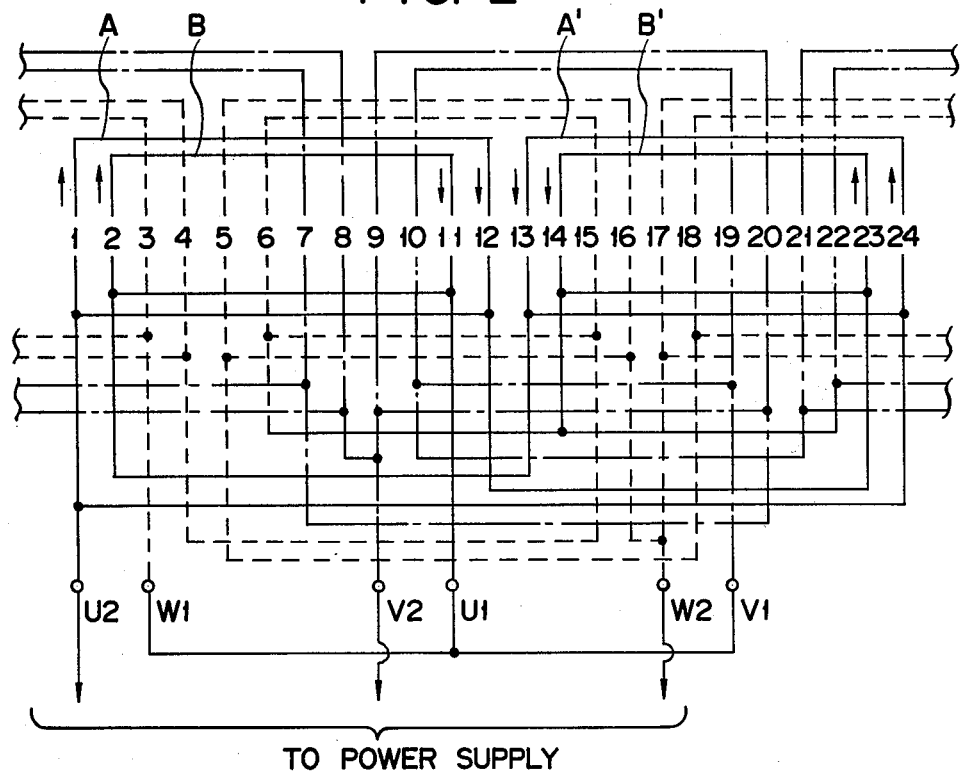
FIG. 2 is a wiring diagram of the three-phase armature windings shown in FIG. 1 when the motor runs at a high speed.

In the three-phase armature windings thus arranged, in a high speed mode, the terminals U2, V2 and W2 are connected to a power supply, while the terminals U1, V1 and W1 are shorted, as shown in FIG. 2. With this connection, a 2×Y (star) connection is formed, as shown in FIG. 3.

As seen from FIG. 2, the conductors are arranged as shown in FIG. 4A, and their magnetomotive forces are distributed to form two poles, as shown in FIG. 4B. That is, FIG. 4A shows an arrangement of conductors wounded (fitted on the armature grooves of two poles) in a two-pole coaxial winding manner, and this conductor arrangement is substantially the same as that of the conventional coaxial armature windings. In FIG. 4A, U and $\overline{U}$ indicate the conductors of the U phase. $\overline{U}$ indicates that the direction of the current flowing therethrough is opposite to that of the current flowing through the conductor U. Similarly, V and $\overline{V}$, and W and $\overline{W}$ indicate that the conductors of the phases V and W, respectively, and $\overline{V}$ and $\overline{W}$ means that the direction of the currents flowing therethrough is opposite to that of those current flowing through the conductors V and W. The distribution of the magnetomotive forces in FIG. 4B is formed at an instant that the U phase current is 1 and the currents of the V and W phases are-$\frac{1}{2}$ in the windings arrangement shown in FIG. 4A, and forms two poles. Arrows in FIG. 2 indicate the directions of the currents flowing through the U phase conductors at the time of forming the magnetomotive distribution.

Figure 5:
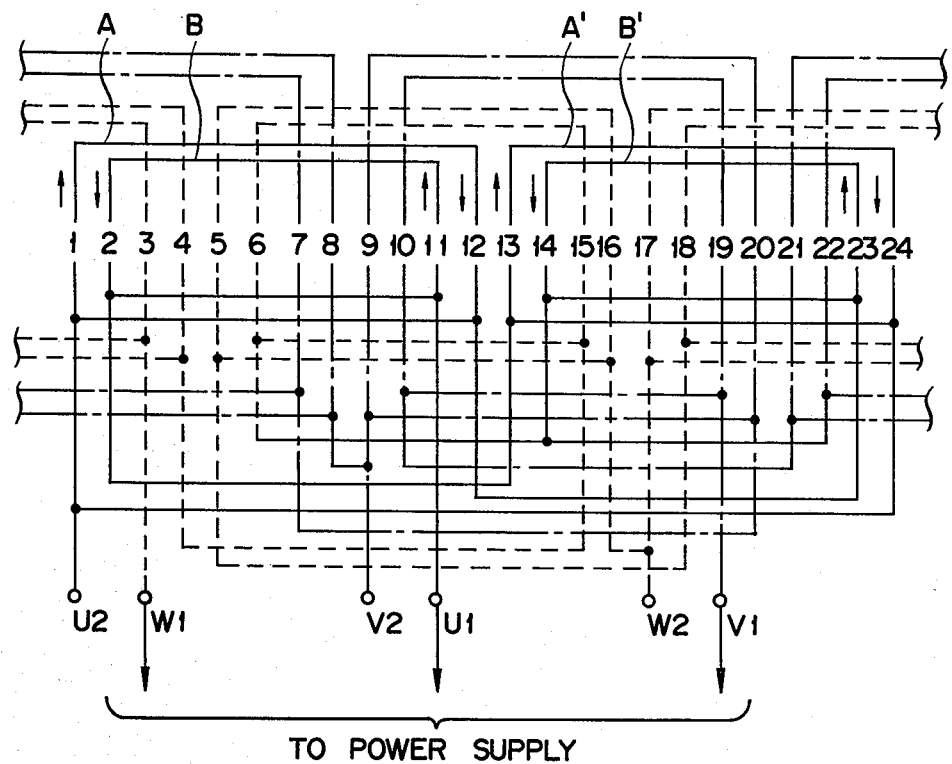
FIG. 5 is a wiring diagram of the three-phase armature windings shown in FIG. 1 when the motor runs at a low speed.
Figure 6:
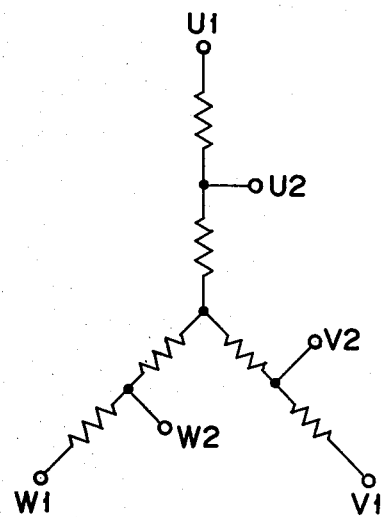
FIG. 6 shows an arrangement of conductors of the three-phase armature windings shown in FIG. 5.
Figures 7A, 7B:
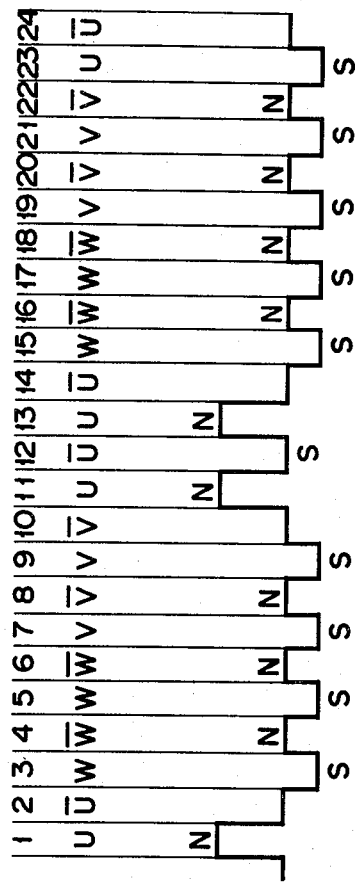
FIG. 7A shows an arrangement of conductors of the three-phase armature windings shown in FIG. 5.
FIG. 7B shows a distribution of magnetomotive forces of the three-phase armature windings shown in FIG. 5.

In a low speed mode, the terminals U1, V1 and W1 of the respective phases are connected to the power supply, while the terminals U2, V2 and W2 are opened, as shown in FIG. 5. A 1×Y (star) connection is formed, as shown in FIG. 6. An arrangement of the conductors in this case is as shown in FIG. 7A. Their magnetomotive forces are distributed as shown in FIG. 7B, at an instant that the U phase current is 1 and the V and W phase currents are-$\frac{1}{2}$, as in the case of the two poles, and form 20 poles.

As described above, in the three-phase pole change type motor of the first embodiment, the armature windings are wound in a coaxial winding manner with the number of pole P1 (=2) for the high speed operation. The coil of each phase is segmented into P1 (32 2) portions. A one-pole portion of each phase coil is comprised of the even number of coils such as the large and small coils A and B or A' and B'. The first coil group (A', B) and second group (A, B') are alternately arranged, the polarity of the first coil group being changed and that of the second coil group being unchanged by changing the connections of the coils for one pole per phase.

With this arrangement, the number of poles P2 (20 poles), which is 10 times the number of poles P1 (2 poles), can be obtained in a manner that the current passage direction of the first coil group is inverted by the simple connection change at the outside of the terminals. In other words, the number of poles is changed at a high ratio, P1:P2=2:20=1:10, by changing the connection of each phase coil. This enable the efficient use of the armature coils, and the size reduction of the armature windings, resulting in more reduction of motor size and cost than those of the conventional two-stage winding pole change type motor. The windings of the smaller number of poles may be manufactured in an extremely easy manner as in the conventional coaxial coil. Further, since the pole number ratio is high (1:10), the regenerative braking is used by changing high to low speeds. This feature is very effective when the pole change type motor of the present embodiment is applied for motors for machine tools, machine tool feeders, and the like.

Figure 8:
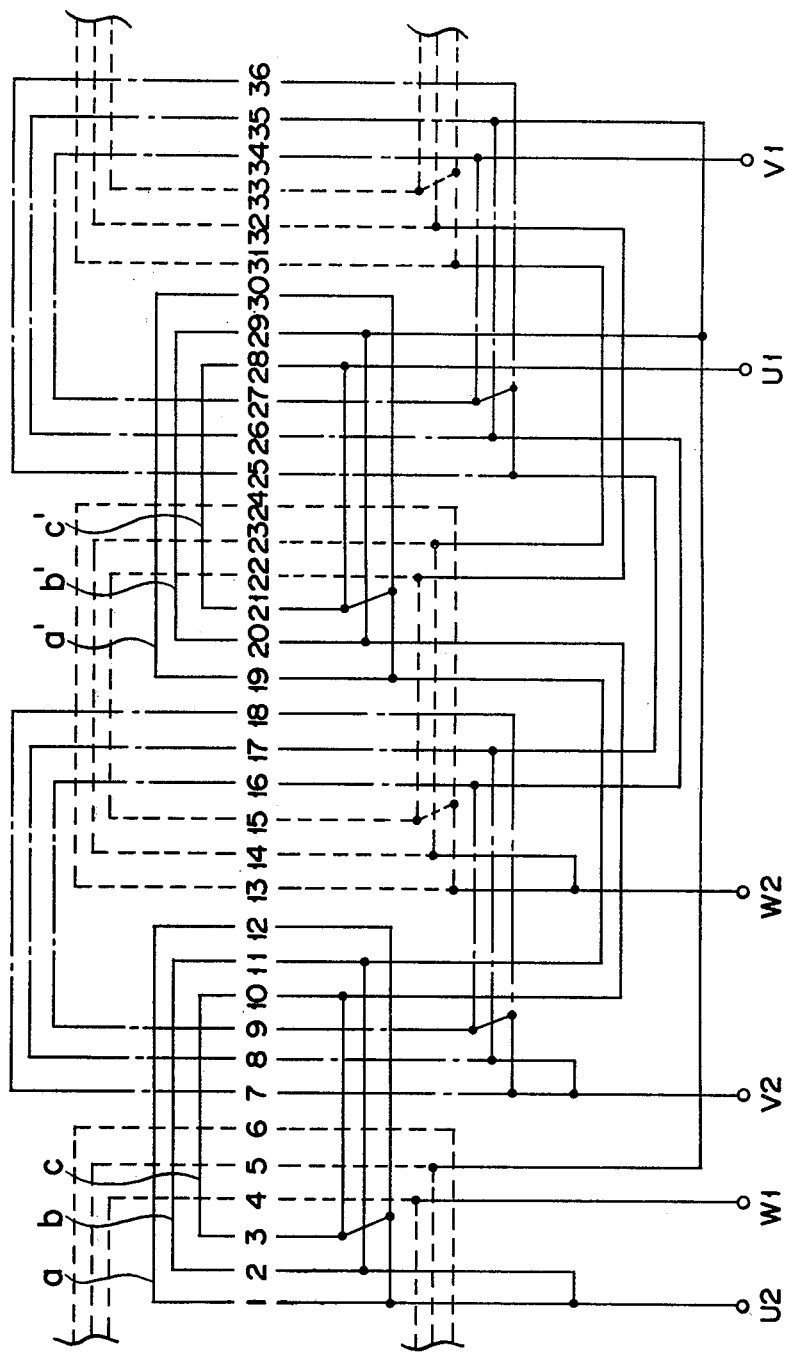
FIG. 8 shows a wiring diagram of three-phase armature windings of a pole change type motor which is a second embodiment of the present invention.

A second embodiment of a pole change type motor according to the present invention will be described referring to the drawings. In the pole change type motor of the second embodiment, a ratio of the number of polarities for the high speed mode to those for the low speed mode is 1:7.5; the number of grooves of the armature is 36; a P1 number of poles for the high speed mode is four; a P2 number of poles for the low speed mode is 30. The polarity change is made between 2 and 30 poles. FIG. 8 shows a wiring diagram of the three-phase armature windings of the second embodiment. In FIG. 8, a solid line indicates a U phase coil; a one dot chain line a V phase coil; a broken line a W phase coil. U1 and U2, V1 and V2, and W1 and W2 indicate terminals of the U, V and W phases, respectively. In FIG. 8, the coil of each of phases U, V, and W is wounded being segmented into P1/2 (=2) portions. In one phase, a one-pole portion still includes an odd number (3) of coils: one or more large coils a, medium coils b and small coils c. An adjacent one-pole portion also includes one or more large coils a', medium coils b' and small coils c', or the odd number (3) of coils. The coils c', a' and coil b combined in series make up first coil groups. The coils a, c and b' combined in series make up second coil groups. These first and second coil groups are alternately arranged.

Figure 9:
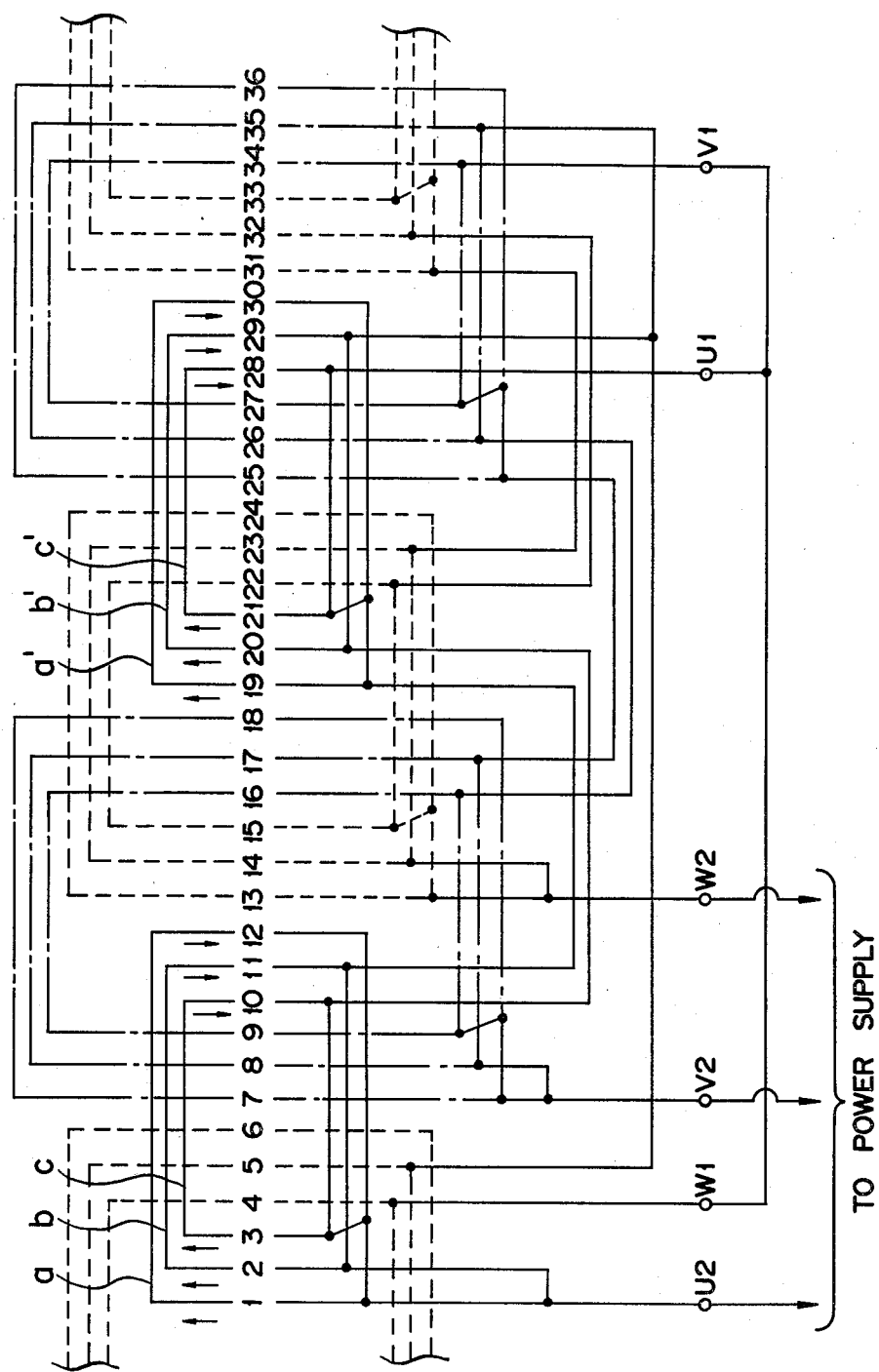
FIG. 9 is a wiring diagram of the three-phase armature windings shown in FIG. 8 when the motor runs at a low speed.

In the three-phase armature windings thus arranged, in a high speed mode, the terminals U2, V2 and W2 are connected to a power supply, while the terminals U1, V1 and W1 are shorted, as shown in FIG. 9. With this connection, a 2×Y (star) connection is formed, as shown in FIG. 3. As seen from FIG. 9, the conductors are arranged as shown in FIG. 10A, and their magnetomotive forces are distributed to form four poles, as shown in FIG. 10B. That is, FIG. 10A shows an arrangement of conductors wounded (fitted on the armature grooves of four poles) in a four-pole coaxial winding manner, and this conductor arrangement is substantially the same as that of the conventional coaxial armature windings. In FIG. 10A, U indicates the conductors of the U phase. $\overline{U}$ indicates that the direction of the current flowing therethrough is opposite to that of the current flowing through the conductor U. Similarly, V and $\overline{V}$, and W and $\overline{W}$ indicate that the conductors of the phases $\overline{V}$ and $\overline{W}$, respectively, and V and W means that the direction of the currents flowing therethrough is opposite to that of those current flowing through the conductors V and W. The distribution of the magnetomotive force in FIG. 10B is formed at an instant that the U phase current is 1 and the currents of the V and W phases are-$\frac{1}{2}$, and is of the four pole type.

Figure 11:
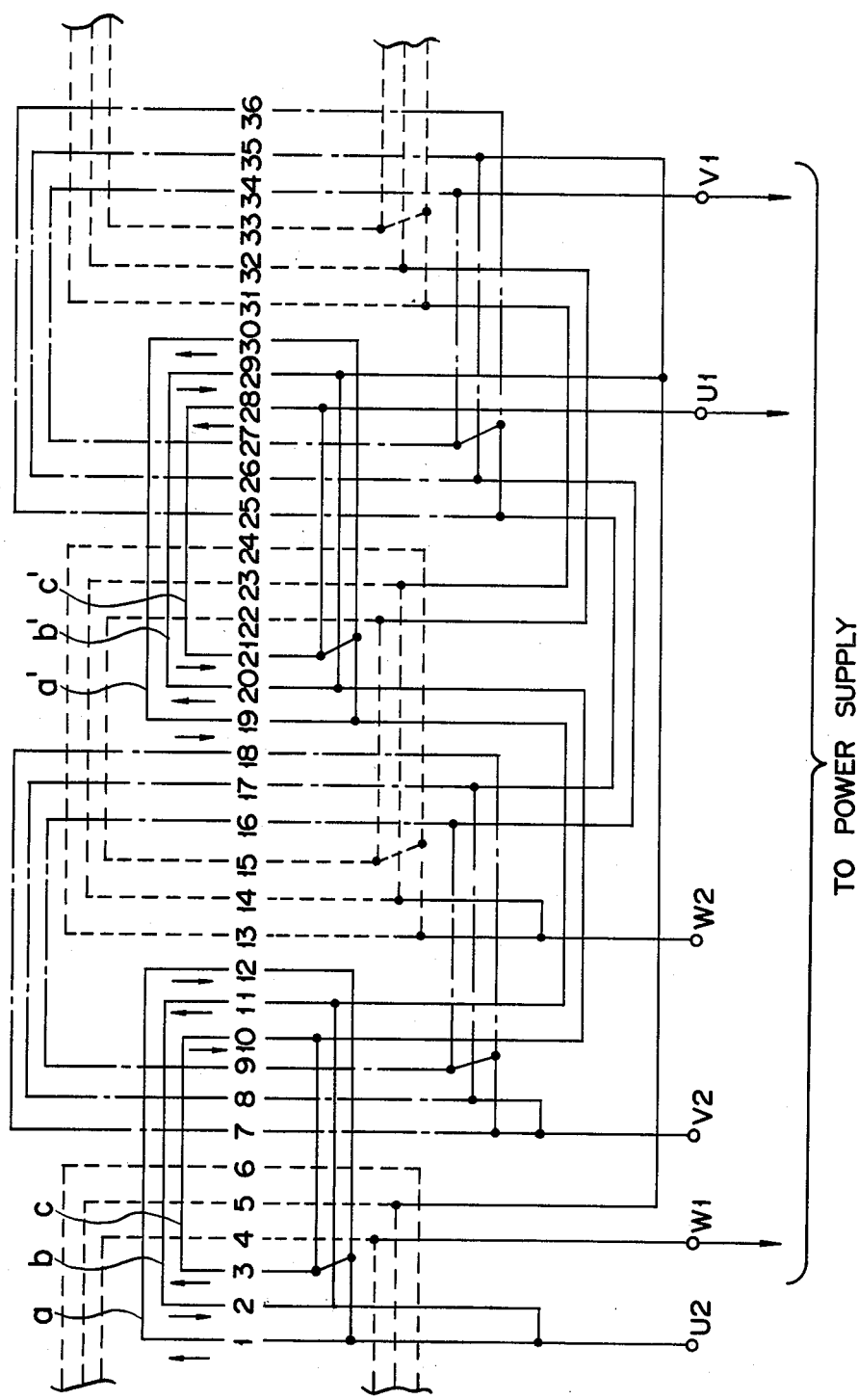
FIG. 11 shows a wiring diagram of the three-phase armature windings shown in FIG. 8 when the motor runs at a low speed.

In a low speed mode, the terminals U1, V1 and W1 of the respective phases are connected to the power supply, while the terminals U2, V2 and W2 are opened, as shown in FIG. 11. A 1×Y (star) connection is then formed, as shown in FIG. 6. An arrangement of the conductors in this case is as shown in FIG. 12A. Their magnetomotive forces are distributed as shown in FIG. 12B at an instant that the U phase current is 1 and the V and W space currents are -½, as in the case of the four poles, and form 30 poles.

As described above, in the three-phase pole change type motor of the second embodiment, the armature windings are wound in a coaxial winding manner with the number of poles P1 (=4) for the high speed operation. The coil of each phase is segmented into P1/2 (=2) portions. A one-pole portion of each phase is comprised of the odd number of coils such as the large, medium and small coils a, b, and c or a', b' and c'. The first coil group (b, a', c') and second coil group (a, c, b') are alternately arranged, the polarity of the first coil group being changed and that of the second coil group being unchanged by changing the connections of the coils for one pole per phase.

With this arrangement, the number of poles P2 (30 poles), which is 7.5 times the number of poles P1 (4 poles), can be obtained in a manner that the current passage direction of the first coil group is inverted by the simple connection change at the outside of the terminals. In other words, the number of poles is changed at a high ratio, P1:P2=4:30=1:7.5, by changing the connections of the coils. This enables the efficient use of the armature windings, and the size reduction of the armature core, resulting in more reduction of motor size and cost than those of the conventional two-stage winding pole change type motor. The windings of the smaller number of poles may be manufactured in an extremely easy manner as in the conventional coaxial coil. Further, since the pole number ratio is high (1:7.5), the regenerative braking is used by changing high to low speeds. This feature is very effective when the pole change type motor of the present embodiment is applied for motors for machine tools, machine tool feeders, and the like.

It should be understood that the present invention is not limited to the first and second embodiments. In the first embodiment, the pole number P1 for the high speed operation is two poles, the pole number P2 for the low speed operation is 20 poles, and the slot number of the core is 24 slots, those, however, may be modified to four poles, forty poles, and 48 slots, respectively. In the second embodiment, the pole number P1 for the high speed operation is four poles, the pole number P2 for the low speed operation is 30 poles, and the slot number of the core is 36 slots. Those, however, may be modified to eight poles, 60 poles, and 72 slots, respectively. Further, in the first and second embodiments, the 2×Y connection and the 1×Y connection are formed for the high and low speed operations, respectively, those connections may be replaced by the 2×Y and the 1×Δ, respectively.

It is evident that the present invention may be modified variously within the spirit of the invention.

What is claimed is:

1. A pole change type motor comprising:
    armature windings wound around an iron core in a coaxial fashion with a P number of poles for a high speed operation, which armature windings provide a Q number of poles for a low speed operation by changing the external connections of said windings; and
    each phase coil of said armature windings being segmented into N portions, a one-pole portion of each phase coil being comprised of a plurality of coils;
    said plurality of coils including one or more first coils of which the polarity is changed by changing the external connections of said armature coils and one or more second coils alternately disposed with respect to said first coils, of which the polarity is left unchanged by changing the external connections.

2. A pole change type motor according claim 1, wherein each phase coil of said armature windings is divided into N=P portions.

3. A pole change type motor according to claim 1, wherein each phase coil of said armature windings is divided into N=P portions, and a ratio of the P number of the poles for the high speed operation to the Q number of the poles for the low speed operation is, P:Q=1:10.

4. A pole change type motor according to claim 1, wherein said P is 2.

5. A pole change type motor according to claim 1, wherein each phase coil of said armature windings is divided into N=P/2 portions.

6. A pole change type motor according to claim 1, wherein each phase coil of said armature windings is divided into N=P/2 portions, and a ratio of the P number of poles for the high speed operation to the Q number of poles for the low speed operation is, P:Q=1:7.5.

7. A pole change type motor according to claim 6, wherein said P is 4.

8. A pole change type motor according to claim 1, wherein said plurality of coils are two coils.

9. A pole change type motor according to claim 1, wherein said plurality of coils are three coils.

* * * * *